United States Patent
Miyai

(10) Patent No.: US 9,894,549 B2
(45) Date of Patent: Feb. 13, 2018

(54) INFORMATION PROCESSING APPARATUS, RADIO COMMUNICATION SYSTEM, AND TERMINAL POSITION ESTIMATION METHOD

(71) Applicant: NEC Corporation, Tokyo (JP)

(72) Inventor: Hiroshi Miyai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 69 days.

(21) Appl. No.: 14/909,893

(22) PCT Filed: May 9, 2014

(86) PCT No.: PCT/JP2014/002463
§ 371 (c)(1),
(2) Date: Feb. 3, 2016

(87) PCT Pub. No.: WO2015/029282
PCT Pub. Date: Mar. 5, 2015

(65) Prior Publication Data
US 2016/0198356 A1    Jul. 7, 2016

(30) Foreign Application Priority Data
Aug. 30, 2013  (JP) .................. 2013-178831

(51) Int. Cl.
*H04W 24/10* (2009.01)
*H04W 16/18* (2009.01)
(Continued)

(52) U.S. Cl.
CPC .......... *H04W 24/10* (2013.01); *H04W 16/18* (2013.01); *H04W 24/08* (2013.01); *H04W 64/00* (2013.01)

(58) Field of Classification Search
None
See application file for complete search history.

(56) References Cited

U.S. PATENT DOCUMENTS 5,570,412 A    10/1996 Leblanc
6,865,395 B2    3/2005 Riley
(Continued)

FOREIGN PATENT DOCUMENTS

CA    2840250 A1    1/2013
EP    2034673 A2    3/2009
(Continued)

OTHER PUBLICATIONS

International Search Report, PCT/JP2014/002463, dated Aug. 5, 2014.
(Continued)

*Primary Examiner* — Robert C. Scheibel
(74) *Attorney, Agent, or Firm* — Young & Thompson

(57) ABSTRACT

An information processing apparatus (10) includes a comparison unit (11) for comparing a plurality of pieces of RF measured information (1046) indicating signal reception information measured for each of a plurality of radio terminals (31 to 34) with a plurality of pieces of RF prediction information (1045) predicted as reception information in one radio terminal for each of a plurality of local areas, and an aggregation unit (12) for aggregating the number of radio terminals which have measured the measured information which is within a predetermined range of the prediction information, among the plurality of pieces of measured information, for each of the plurality of local areas.

20 Claims, 6 Drawing Sheets

(51) Int. Cl.
*H04W 24/08* (2009.01)
*H04W 64/00* (2009.01)

(56) References Cited

U.S. PATENT DOCUMENTS

| | | | |
|---|---|---|---|
| 8,041,304 B2* | 10/2011 | Yamada | H04W 64/003 |
| | | | 333/128 |
| 8,346,282 B1 | 1/2013 | Dronamraju et al. | |
| 8,559,966 B2 | 10/2013 | Bernini et al. | |
| 2005/0090263 A1 | 4/2005 | Ebata | |
| 2007/0060170 A1 | 3/2007 | Fukui | |
| 2011/0092220 A1 | 4/2011 | Bernini et al. | |
| 2012/0184301 A1* | 7/2012 | Jovicic | G01S 5/0081 |
| | | | 455/456.5 |
| 2013/0122941 A1 | 5/2013 | Das et al. | |
| 2013/0281063 A1* | 10/2013 | Jactat | H04W 24/08 |
| | | | 455/411 |
| 2014/0044002 A1 | 2/2014 | Fujishiro | |
| 2014/0113638 A1* | 4/2014 | Zhang | H04W 16/18 |
| | | | 455/446 |
| 2014/0315496 A1* | 10/2014 | Hamada | H04W 24/10 |
| | | | 455/67.11 |
| 2015/0230100 A1 | 8/2015 | Atia | |
| 2015/0382203 A1* | 12/2015 | Kitsunezuka | H04W 16/18 |
| | | | 370/254 |
| 2017/0251378 A1* | 8/2017 | Uchiyama | H04W 16/18 |

FOREIGN PATENT DOCUMENTS

| | | |
|---|---|---|
| JP | 08-182035 | 7/1996 |
| JP | 2005-117357 | 4/2005 |
| JP | 2011-019109 | 1/2011 |
| JP | 2011-519520 | 7/2011 |
| JP | 2012-054921 | 3/2012 |
| JP | 2013-121073 | 6/2013 |
| RU | 2354990 | 5/2009 |
| WO | WO 2012/144338 | 10/2012 |

OTHER PUBLICATIONS

Extended European Search Report (EESR) dated Mar. 22, 2017; Application No. 14840595.4.
Russian Official Action—2016111282—dated Jun. 29, 2017.

* cited by examiner

| Area | LOCAL AREA INFORMATION | | Cell-ID | RF PREDICTION INFORMATION | | |
|---|---|---|---|---|---|---|
| | LATITUDE | LONGITUDE | | RSRP | RSRQ | RSSI |
| #00010 | 11.1111 ~ 22.2222 | 33.3333 ~ 44.4444 | 11 | -78dBm | -8dB | -51dBm |
| #00010 | 11.1111 ~ 22.2222 | 33.3333 ~ 44.4444 | 12 | -93dBm | -9dB | -60dBm |
| #00010 | 11.1111 ~ 22.2222 | 33.3333 ~ 44.4444 | 13 | -102dBm | -10dB | -65dBm |
| #00010 | 11.1111 ~ 22.2222 | 33.3333 ~ 44.4444 | 14 | -107dBm | -10dB | -68dBm |

Fig. 3

INFORMATION PROCESSING APPARATUS, RADIO COMMUNICATION SYSTEM, AND TERMINAL POSITION ESTIMATION METHOD

TECHNICAL FIELD

The present invention relates to an information processing apparatus, a radio communication system, a terminal position estimation method, and a terminal position estimation program, and more particularly, to an information processing apparatus, a radio communication system, a terminal position estimation method, and a terminal position estimation program that estimate the number of terminals for each local area.

BACKGROUND ART

When additional base stations are installed, it is required to specify a Hotspot (an area in which there are a large number of terminals and there is a large amount of traffic) in a cell in which a processing load of existing base stations is high in order to determine the place to install the additional base stations. This is done to prepare a plan for efficiently installing the base stations.

Patent Literature 1 discloses a technique related to a method and a system for dynamically configuring telecommunications networks. In the method disclosed in Patent Literature 1, a signal-to-noise ratio is predicted and network cells are dynamically re-configured according to a cell load factor.

Patent Literature 2 discloses a technique related to a radio communication system and the like that estimate radio propagation by correcting theoretical simulations by a measured value and determine transmission power of a base station apparatus from the estimation results.

Patent Literature 3 discloses a technique in which a managing server and the like acquire load information from a plurality of access points and terminals, an evaluation value defined in advance for evaluating a load situation is calculated, and the load situation of each cell is controlled in such a way that this evaluation value is minimized.

Patent Literature 4 discloses a technique in which a plurality of update centers are provided at known fixed locations within a base station coverage area and each of the update centers transmits its own pre-calibrated location information to a location databank along with real-time RF measurement values for the base station in cooperation with at least one mobile unit.

CITATION LIST

Patent Literature

[Patent Literature 1] Published Japanese Translation of PCT International Publication for Patent Application, No. 2011-519520

[Patent Literature 2] Japanese Unexamined Patent Application Publication. 2011-019109

[Patent Literature 3] Japanese Unexamined Patent Application Publication. 2005-117357

[Patent Literature 4] Japanese Unexamined Patent Application Publication. 08-182035

SUMMARY OF INVENTION

Technical Problem

In the aforementioned Patent Literature 1, detection of load information in units of cells (e.g., the number of terminals in units of cells) is carried out. However, in Patent Literature 1, it is impossible to specify the Hotspot in a cell, which is a local area in which there are a large number of actual terminals. The same is true for Patent Literature 3, which uses the load information in units of access points.

The Hotspot may be specified, for example, by checking the population density by a GPS (Global Positioning System), external information, or field research (e.g., travelling test).

However, the method of specifying the Hotspot by collecting the positional information or the like by the GPS depends on the function and the configuration of the radio terminal. Therefore, the positional information can be collected only from a terminal that is available and cannot be controlled by an operator and is equipped with the GPS. For example, in Patent Literature 2, the mobile terminal needs to have a function of acquiring locations of observation points. Further, in Patent Literature 4, the update center needs to have a function of transmitting the positional information on itself. Therefore, there is a problem that, in order to achieve them, it is required to use a radio terminal having a function of collecting the positional information in advance, to add the function of collecting the positional information to the radio terminal, or to change the configurations or the like.

Another problem in the method of specifying the Hotspot by checking the population density is that it requires manpower and labor for performing the travelling test and the accuracy for specifying the Hotspot is low.

Due to the above reasons, there is a problem that it is impossible to efficiently specify the spot in which there are a large number of terminals without depending on the specific function of the radio terminal.

The present invention has been made in order to solve the above problems and aims to provide an information processing apparatus, a radio communication system, a terminal position estimation method, and a terminal position estimation program to efficiently extract positional information on a radio terminal without depending on a specific function of the radio terminal.

Solution to Problem

An information processing apparatus according to a first exemplary aspect of the present invention includes: comparison means for comparing a plurality of pieces of measured information indicating signal reception information measured for each of a plurality of radio terminals with a plurality of pieces of prediction information predicted as the reception information in one radio terminal for each of a plurality of local areas; and aggregation means for aggregating the number of radio terminals which have measured the measured information which is within a predetermined range of the prediction information, among the plurality of pieces of measured information, for each of the plurality of local areas.

A radio communication system according to a second exemplary aspect of the present invention includes: a plurality of radio terminals; a plurality of base stations that can communicate with at least one of the plurality of radio terminals; and an information processing apparatus that can communicate with the plurality of base stations, in which the information processing apparatus includes: comparison means for comparing a plurality of pieces of measured information indicating signal reception information measured for each of the plurality of radio terminals with a plurality of pieces of prediction information predicted as the reception information in one radio terminal for each of a plurality of local areas; and aggregation means for aggregating the number of radio terminals which have measured the measured information which is within a predetermined range of the prediction information, among the plurality of pieces of measured information, for each of the plurality of local areas.

A terminal position estimation method according to a third exemplary aspect of the present invention is a terminal position estimation method that estimates positions of a plurality of radio terminals using an information processing apparatus, in which: the information processing apparatus compares a plurality of pieces of measured information indicating signal reception information measured for each of a plurality of radio terminals with a plurality of pieces of prediction information predicted as the reception information in one radio terminal for each of a plurality of local areas, and the information processing apparatus aggregates the number of radio terminals which have measured the measured information which is within a predetermined range of the prediction information, among the plurality of pieces of measured information, for each of the plurality of local areas.

A terminal position estimation program according to a fourth exemplary aspect of the present invention causes a computer to execute the following processing of: comparing a plurality of pieces of measured information indicating signal reception information measured for each of a plurality of radio terminals with a plurality of pieces of prediction information predicted as the reception information in one radio terminal for each of a plurality of local areas; and aggregating the number of radio terminals which have measured the measured information which is within a predetermined range of the prediction information, among the plurality of pieces of measured information, for each of the plurality of local areas.

Advantageous Effects of Invention

According to the present invention, it is possible to provide an information processing apparatus, a radio communication system, a terminal position estimation method, and a terminal position estimation program to efficiently extract positional information of a radio terminal without depending on a specific function of the radio terminal.

BRIEF DESCRIPTION OF DRAWINGS

FIG. 3 is a diagram showing an example of RF prediction information according to the first exemplary embodiment of the present invention;

DESCRIPTION OF EMBODIMENTS

In the following description, with reference to the drawings, a specific exemplary embodiment to which the present invention is applied will be described in detail. Throughout the drawings, the same components are denoted by the same reference symbols and overlapping descriptions will be omitted as necessary for the sake of clarification of the description.

First Exemplary Embodiment of Present Invention

Figure 1:
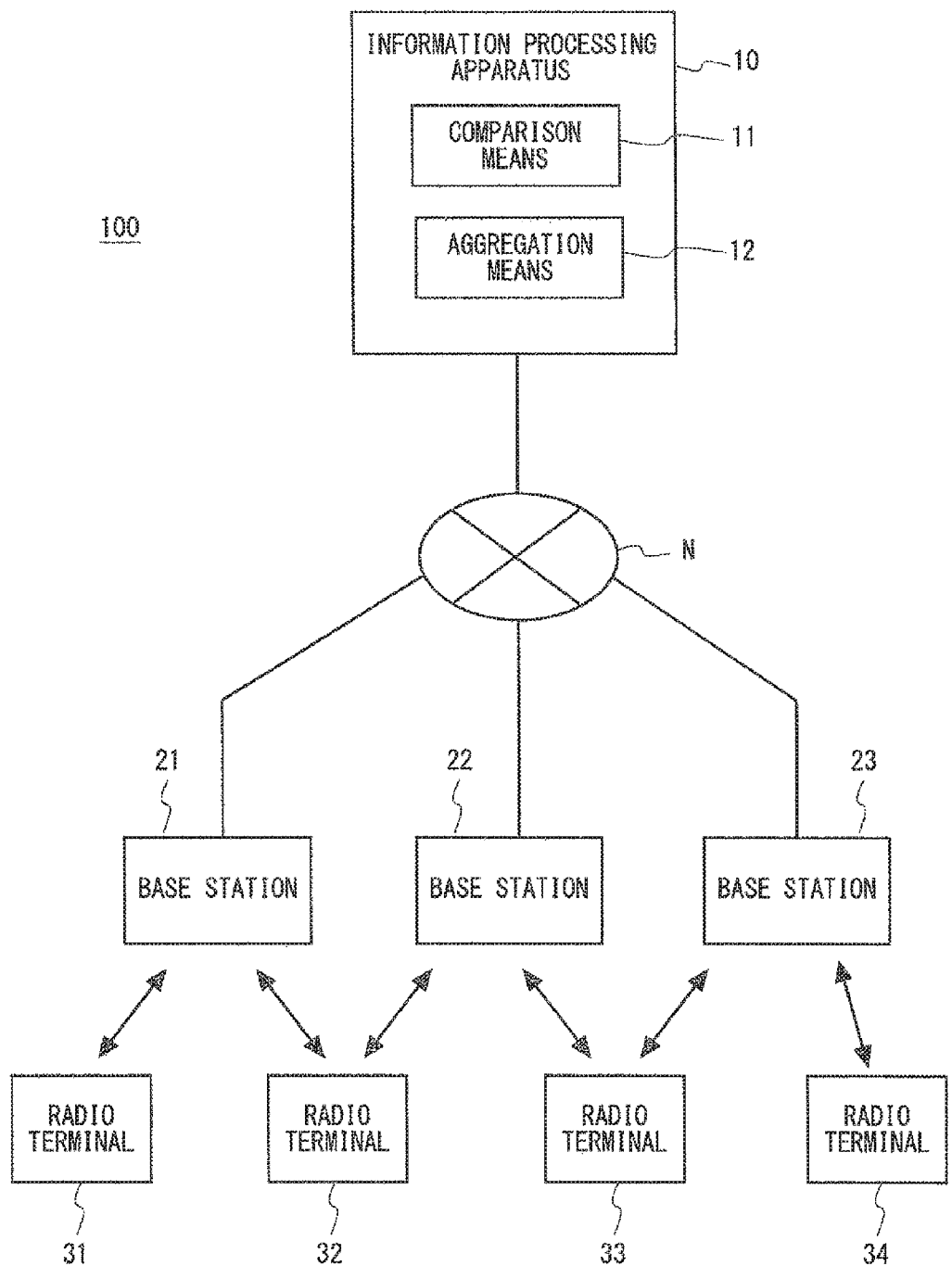
FIG. 1 is a block diagram showing a whole configuration of a radio communication system according to a first exemplary embodiment of the present invention.

FIG. 1 is a block diagram showing a whole configuration of a radio communication system 100 according to a first exemplary embodiment of the present invention. The radio communication system 100 includes an information processing apparatus 10, base stations 21 to 23, and radio terminals 31 to 34. The information processing apparatus 10 and the base stations 21 to 23 are connected via a network N and can communicate with each other. Further, each of the radio terminals 31 to 34 is able to communicate with at least one of the base stations 21 to 23 by radio. The radio terminals 31 to 34 may be referred to as user terminals (UEs). Note that the number of base stations 21 to 23 and the number of radio terminals 31 to 34 are not limited to the numbers stated above.

Further, the base stations 21 to 23 and the radio terminals 31 to 34 may have general functions and can be achieved using a known technique. Therefore, detailed descriptions thereof will be omitted. Note that some of the radio terminals 31 to 34 do not have a function of acquiring and transmitting positional information such as a GPS.

In the following description, the term "cell" indicates a communication coverage area (service area) covered by one base station. The "local area" is a part of a region in the cell. That is, the local area is narrower than the service area. Further, a radio terminal located in one local area is able to receive radio waves of cells of a plurality of base stations and measure the reception quality of them.

The information processing apparatus 10 at least includes a comparison means 11 and an aggregation means 12. The comparison means 11 compares a plurality of pieces of measured information with a plurality of pieces of prediction information. The plurality of pieces of measured information indicate signal reception information measured for each of the radio terminals 31 to 34. Further, the plurality of pieces of prediction information indicate information predicted as the signal reception information in an arbitrary radio terminal for each of the plurality of local areas. The aggregation means 12 aggregates the number of radio terminals which have measured the measured information which is within a predetermined range of the prediction information, among the plurality of pieces of measured information, for each of the plurality of local areas.

Accordingly, by using the prediction information and the measured information without using the positional information of each radio terminal, it is possible to estimate the number of radio terminals for each local area, which is a part of the cell. That is, it is possible to efficiently extract the positional information of the radio terminal without depending on the specific function (e.g., GPS and the like) of the radio terminal. It is therefore possible to specify the Hotspot and prepare a plan for efficiently installing the additional base stations.

For example, according to the exemplary embodiment of the present invention, the distribution of the areas (local areas) of the actual number of terminals is grasped by the network, whereby it is possible to estimate the number of terminals that exist in each local area by comparing the RF prediction information obtained from the RF simulation results (RF coverage estimation program) with the RF measured information reported by the actual terminals.

The information processing apparatus 10 may include, for example, an RF (Radio Frequency) simulation server as an O&M (Operation and Maintenance) server and a database. Alternatively, the information processing apparatus 10 may be a SON (Self Organization Network) server, an EMS (Element Management System) (O&M), or an eNodeB (that uses an X2 interface), or another server. However, examples of the information processing apparatus 10 are not limited to them.

In the above cases, the information processing apparatus 10 includes the following configuration. That is, the information processing apparatus 10 further includes collection means (not shown) for collecting a plurality of pieces of measured information from the respective radio terminals 31 to 34. In this case, the comparison means 11 compares the plurality of pieces of measured information collected by the collection means with the plurality of pieces of prediction information. The information processing apparatus 10 further includes prediction means for predicting the reception information in the one radio terminal for each of the plurality of local areas as the plurality of pieces of prediction information. In this case, the comparison means 11 compares the plurality of pieces of measured information with the plurality of pieces of prediction information predicted by the prediction means. The collection means and the prediction means are not necessarily provided and only one of them may be provided. In this case, it is sufficient that the prediction information or the measured information is supplied to the information processing apparatus 10 in advance.

Figure 2:
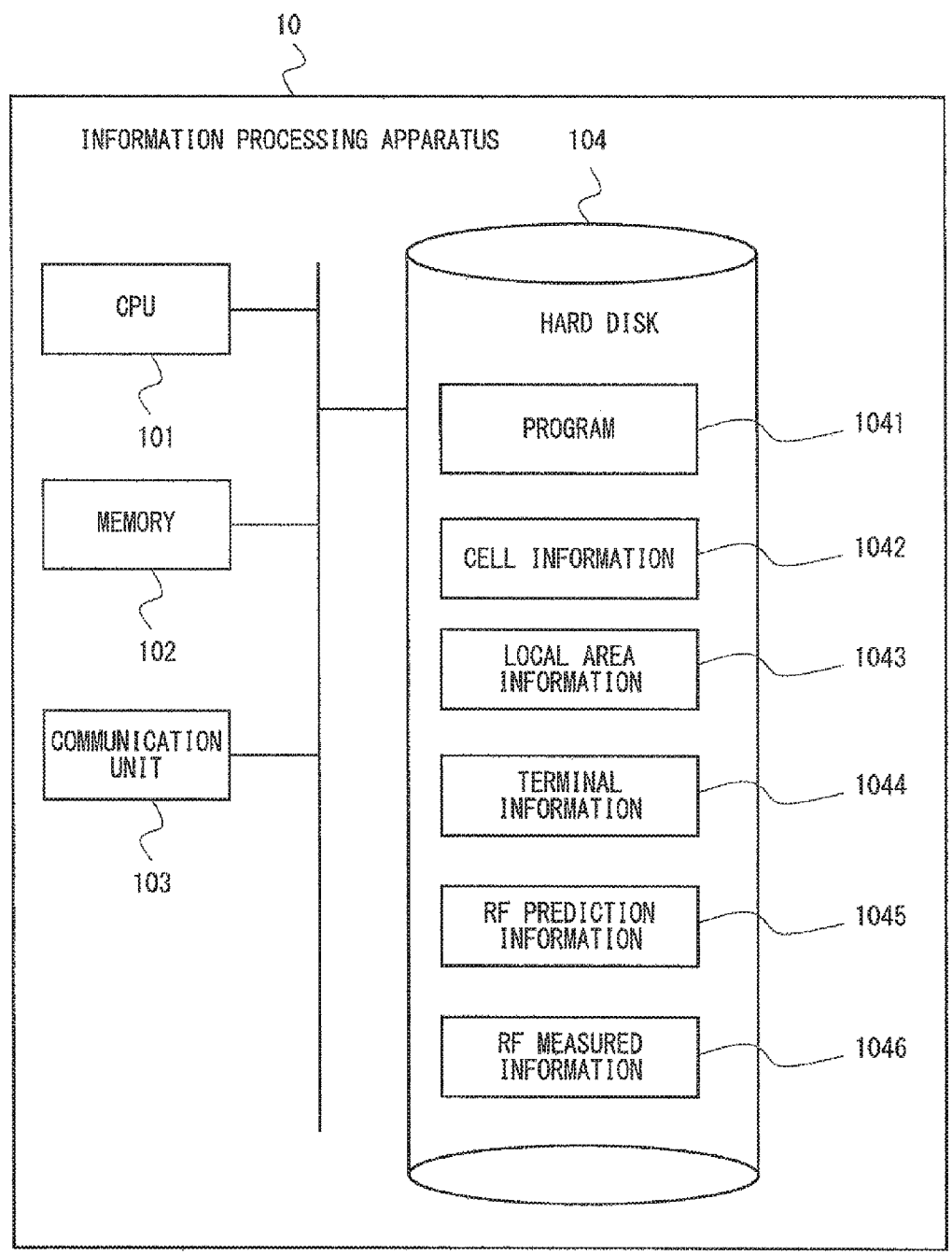
FIG. 2 is a block diagram showing a configuration of an information processing apparatus according to the first exemplary embodiment of the present invention.

FIG. 2 is a block diagram showing a configuration of the information processing apparatus 10 according to the first exemplary embodiment of the present invention. The information processing apparatus 10 includes a CPU (Central Processing Unit) 101, a memory 102, a communication unit 103, and a hard disk 104.

The hard disk 104 is a non-volatile storage device. The hard disk 104 stores an OS (not shown), a program 1041, a cell information 1042, a local area information 1043, a terminal information 1044, an RF prediction information 1045, an RF measured information 1046 and the like. The program 1041 is a computer program in which terminal position estimation processing according to the first exemplary embodiment of the present invention (e.g., processing shown in FIG. 5 described later) or the like is implemented. The hard disk 104 may store, besides the program 1041, an RF simulation program (not shown) such as an RF coverage estimation program.

The cell information 1042 is information regarding the base stations 21 to 23 and the cells (including the cell IDs). The local area information 1043 is information regarding the local area (spot) including the Area ID, the latitude, the longitude and the like. The terminal information 1044 is information regarding the radio terminals 31 to 34 (including the terminal IDs and the like). The RF prediction information 1045 is one example of the prediction information stated above. The RF measured information 1046 is one example of the measured information stated above.

The CPU 101 controls various processes in the information processing apparatus 10, access to the memory 102, the communication unit 103, and the hard disk 104 and the like. The communication unit 103 communicates with external devices via the network N.

In the information processing apparatus 10, the CPU 101 reads the OS, the program 1041 or the like stored in the memory 102 or the hard disk 104 and executes the OS, the program or the like. The information processing apparatus 10 is therefore able to achieve terminal position estimation processing and the like.

Referring back to FIG. 1, the explanation will be continued. In the following description, it is assumed that the information processing apparatus 10 is an RF simulation server. The RF simulation server executes simulations using the position of the base station, settings of the transmission output or the like and stores the RF prediction information in each local area (one example of the prediction information) in the database. The RF prediction information obtained by the simulations may include at least one of RSRP (Reference Symbol Received Power), RSRQ (Reference Symbol Received Quality), and RSSI (Received Signal Strength Indicator) of the cell received in each local area or a combination thereof. Further, an SINR (Signal to Interference plus Noise Ratio), which is an interference level, may be included. That is, the reception information described above may be a combination of a plurality of types of measured values including, for example, RSRP, RSRQ, RSSI, or SINR.

Further, the RF prediction information may include a combination of a plurality of cells that are predicted to be able to communicate with the one radio terminal for each local area and the reception information in each cell.

FIG. 3 is a diagram showing an example of the RF prediction information according to the first exemplary embodiment of the present invention. For example, the combination of the RF information such as RSRP, RSRQ, RSSI or the like is predicted by each of cells (Cell-ID=11, 12, 13, 14) measured in a local area A (Area #00010, latitude 11.1111, longitude 33.3333) and the predicted combination is stored in the database. Besides the information on the latitude and the longitude, the information on the local area may be used by defining a given area section as described above.

Figure 4:
FIG. 4 is a diagram showing an example of RF measured information according to the first exemplary embodiment of the present invention.

Further, the RF measured information may include a combination of the plurality of cells in which the reception information is measured for each radio terminal and the reception information in each cell. FIG. 4 is a diagram showing an example of the RF measured information according to the first exemplary embodiment of the present invention. For example, one radio terminal is able to receive signals from the plurality of cells (Cell–ID=11, 12, 13, 14) and measures RSRP, RSRQ, and RSSI in the respective cells.

That is, the radio terminals 31 to 34 receive signals from the plurality of respective base stations with which they can communicate at a point currently positioned and measure the RF measured value information for each cell. The radio terminals 31 to 34 then transmit the RF measured value information to the respective base stations to which they currently belong. The radio terminals 31 to 34 also transmit their terminal IDs when they transmit the RF measured value information. The respective base stations 21 to 23 receive the RF measured value information (cell ID, RSRP, RSRQ, RSSI or the like) transmitted from the radio terminals 31 to 34 and periodically notify the RF simulation server of the RF measured value information. The RF simulation server periodically receives the RF measured information reported from the respective radio terminals 31 to 34 via one of the base stations 21 to 23.

Figure 5:
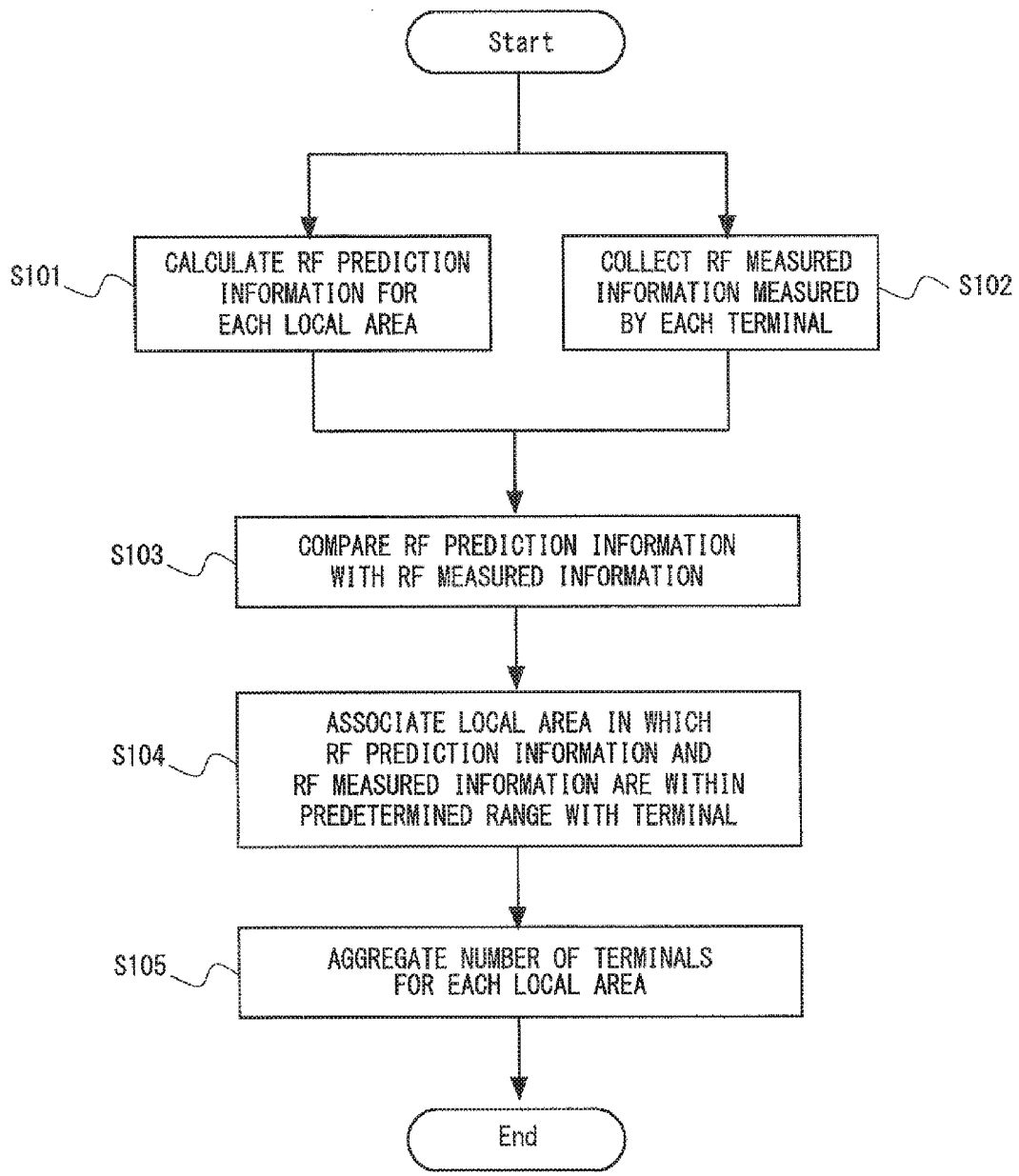
FIG. 5 is a flowchart showing a flow of terminal position estimation processing according to the first exemplary embodiment of the present invention.

FIG. 5 is a flowchart showing a flow of the terminal position estimation processing according to the first exemplary embodiment of the present invention. First, the RF simulation server calculates the RF prediction information for each local area (S101). For example, the RF simulation server (e.g., prediction means stated above) executes the predetermined RF simulation based on the position of the base station, the settings of the transmission power or the like. The RF simulation server then stores the results in the database (hard disk 104) as the RF prediction information 1045 for each local area.

On the other hand, the base stations 21 to 23 receive the RF measured value information (RSRP, RSRQ, RSSI or the like for each reception cell) reported from the respective radio terminals and periodically notify the RF simulation server of the RF measured value information. That is, the RF simulation server (e.g., collection means described above) collects the RF measured value information from the respective radio terminals via the base stations (S102). At this time, the RF simulation server may store the RF measured value information that has been collected in the database (hard disk 104) as the RF measured information 1046 for each radio terminal.

After that, the RF simulation server (comparison means 11) refers to the hard disk 104 and compares the RF prediction information with the RF measured information (S103). In particular, the comparison means 11 determines whether the RF prediction information is within a predetermined range of the RF measured information based on a degree of agreement of the combination of the reception information (RSRP, RSRQ, RSSI or the like) in the RF prediction information and that in the RF measured information.

Further, the comparison means 11 determines whether the RF prediction information is within a predetermined range of the RF measured information based on a combination of the plurality of cells in the RF prediction information and that in the RF measured information that agree with each other and the degree of agreement of the reception information (RSRP, RSRQ, RSSI or the like) corresponding to the respective cells that agree with each other. Accordingly, the accuracy of specifying the local area in which the radio terminal exists is improved.

The degree of agreement may be a range in which it can be inferred that they agree with each other and includes a case in which the values of the reception information (RSRP, RSRQ, RSSI or the like) completely agree with each other, a case in which a part of the values agree with each other, and a case where a difference between the respective values is within a predetermined value. A statistical method may be used as well.

The RF simulation server (aggregation means 12) associates the local area in which the RF prediction information and the RF measured information are within a predetermined range with the terminal (S104). After that, the RF simulation server (aggregation means 12) aggregates the number of terminals for each local area (S105). That is, the aggregation means 12 associates the radio terminal in the RF measured information within a predetermined range of the RF prediction information, among the plurality of pieces of RF measured information, with the local area in the RF prediction information, and aggregates the number of radio terminals that have been associated for each of the plurality of local areas.

In other words, the RF simulation server estimates the position of the terminal by specifying the information in which the combinations of the cells agree with each other or the information that can be inferred. Further, the RF simulation server adds up the number of terminals that have been estimated for each local area to predict the number of terminals for each local area.

The terminal position estimation processing may not be performed immediately after the RF measured information is collected from the radio terminal and may be performed at regular time intervals. Further, each radio terminal may transmit the RF measured information at the time of an incoming or outgoing call or when another event occurs. Alternatively, each radio terminal may periodically transmit the RF measured information. Further, the RF simulation server may send a request for transmitting the RF measured information via the base station to each radio terminal and each radio terminal may transmit the RF measured information in response to the transmission request.

Figure 6:
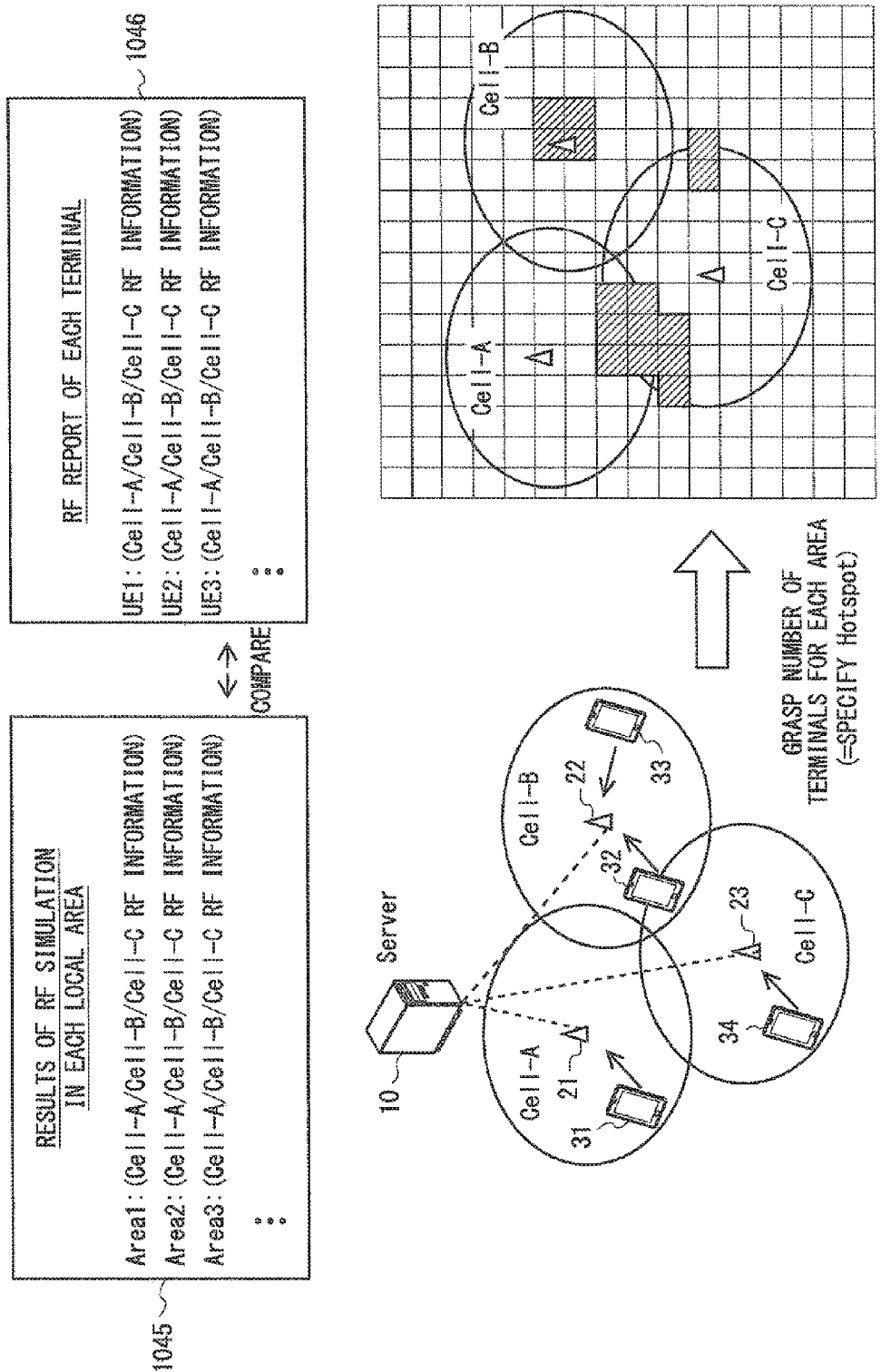
FIG. 6 is a diagram showing a concept of the terminal position estimation processing according to the first exemplary embodiment of the present invention.

FIG. 6 is a diagram showing a concept of the terminal position estimation processing according to the first exemplary embodiment of the present invention. It is assumed here that the information processing apparatus 10 calculates the RF prediction information 1045 that is predicted to be received from a Cell-A (base station 21), a Cell-B (base station 22), and a Cell-C (base station 23) in each local area (Area1 to Area3) from the RF simulation or includes the RF prediction information 1045 in advance. Further, it is assumed that the information processing apparatus 10 collects the RF report (RF measured information 1046) measured by the Cell-A, the Cell-B, and the Cell-C in the respective terminals (UE1 to UE3, radio terminals 31 to 34) or includes the RF report in advance. Further, hatched regions in the lower left portion in FIG. 6 show the local areas in which it is specified by the information processing apparatus 10 that there are radio terminals. Note that, however, the hatched regions shown in FIG. 6 do not correspond to the number of radio terminals 31 to 34 and the arrangement of the radio terminals 31 to 34.

As described above, according to the exemplary embodiment of the present invention, it is possible to efficiently specify the Hotspot in the cell, which is a spot (local area) where there are a large number of actual terminals. Further, the Hotspot in the cell can be specified without having an impact on existing terminals (users) (without giving high functions to terminals, that is, without influencing the terminals) and without having to take the trouble to execute the travelling test or the like. In this way, by efficiently specifying the Hotspot, it is possible, in particular, to reduce OPEX (Operating Expense) required for the RF design when additional base stations are installed.

Other Exemplary Embodiments of Present Invention

The exemplary embodiment of the present invention may be expressed as follows. That is, the RF simulation is executed by a server (RF simulation server or the like) connected to the respective base stations, and the RF data (RF prediction information) for each detailed point (local area) obtained by the RF simulation is compared with the RF measured information reported from the respective radio terminals, whereby the number of radio terminals that are present for each detailed point is predicted.

Alternatively, each of the base stations is connected to a desired server and the server stores the RF data (RF prediction information) for each point (local area) as the RF simulation results in advance. On the other hand, the reports that the radio terminal sends to the base station include the RF measured information (radio wave intensity/quality or the like of one cell and neighboring cells) and the server collects the reports via the base stations. By comparing the RF information for each terminal obtained by the RF simulation with the RF information for each point stored in the server, it is possible to predict the number of terminals that are present in each spot.

The present invention is applicable to mobile communication systems such as, for example, LTE (Long Term Evolution), WCDMA (registered trademark) (Wideband Code Division Multiple Access), and GSM (registered trademark) (Global System for Mobile Communications). The present invention may also be used when the distribution of the terminal areas of the current network is grasped to install additional base stations or to newly introduce another system.

Further, needless to say, the present invention is not limited to the exemplary embodiments stated above and various changes can be made to the present invention without departing from the spirit of the present invention already stated above. For example, the present invention has been described as the hardware configuration in the above exemplary embodiments. However, the present invention is not limited to this configuration. The present invention is able to achieve desired processing by causing a CPU (Central Processing Unit) to execute a computer program.

In the above examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, a digital versatile disc (DVD), a Blu-ray (registered trademark) disc (BD), and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present invention has been described with reference to the exemplary embodiments, the present invention is not limited to the above exemplary embodiments. Various changes that can be understood by those skilled in the art can be made to the configurations and the details of the present invention within the scope of the present invention.

This application is based upon and claims the benefit of priority from Japanese Patent Application No. 2013-178831, filed on Aug. 30, 2013, the disclosure of which is incorporated herein in its entirety by reference.

REFERENCE SIGNS LIST

100 RADIO COMMUNICATION SYSTEM
10 INFORMATION PROCESSING APPARATUS
11 COMPARISON MEANS
12 AGGREGATION MEANS
N NETWORK
21 BASE STATION
22 BASE STATION
23 BASE STATION
31 RADIO TERMINAL
32 RADIO TERMINAL
33 RADIO TERMINAL
34 RADIO TERMINAL
101 CPU
102 MEMORY
103 COMMUNICATION UNIT
104 HARD DISK
1041 PROGRAM
1042 CELL INFORMATION
1043 LOCAL AREA INFORMATION
1044 TERMINAL INFORMATION
1045 RF PREDICTION INFORMATION
1046 RF MEASURED INFORMATION

The invention claimed is:

1. An information processing apparatus, comprising:
at least one memory with instructions stored thereon, and
at least one processor in communication with the memory and configured, upon execution of the instructions to:
compare a plurality of pieces of measured information with a plurality of pieces of prediction information, the measured information being obtained by measuring a signal received from a base station, which is measured by each of a plurality of radio terminals for each of a plurality of cells of a plurality of base stations, the prediction information which is predicted as the reception information in one radio terminal for each of a plurality of local areas, and the local area is a part of a region in a service area of one base station; and
aggregate the number of radio terminals which have measured the measured information which is within a predetermined range of the prediction information, among the plurality of pieces of measured information, for each of the plurality of local areas, thereby to identify a hotspot in at least one of said plurality of cells.

2. The information processing apparatus according to claim 1, wherein:
the reception information is a combination of a plurality of types of measured values, and
the instructions further configure the at least one processor to determine whether the prediction information is within a predetermined range of the measured information based on a degree of agreement of the combination in the plurality of pieces of measured information and that in the plurality of pieces of prediction information.

3. The information processing apparatus according to claim 2, wherein:
the measured information comprises a combination of a plurality of cells in which the reception information is measured for each of the radio terminals and the reception information in each cell,
the prediction information comprises a combination of a plurality of cells that are predicted to be able to communicate with the one radio terminal for each of the local areas and the reception information in each cell, and
the instructions further configure the at least one processor to determine whether the prediction information is within a predetermined range of the measured information based on a combination of the plurality of cells in the plurality of pieces of prediction information and that in the plurality of pieces of measured information that agree with each other and the degree of agreement of the reception information corresponding to the respective cells that agree with each other.

4. The information processing apparatus according to claim 2, wherein:

the instructions further configure the at least one processor to associate the radio terminal in measured information within a predetermined range of the prediction information, among the plurality of pieces of measured information, with the local area in the prediction information, and the number of radio terminals that have been associated is aggregated for each of the plurality of local areas.

5. The information processing apparatus according to claim 2, wherein the reception information comprises at least one of RSRP (Reference Symbol Received Power), RSRQ (Reference Symbol Received Quality), and RSSI (Received Signal Strength Indicator).

6. The information processing apparatus according to claim 2,
wherein the instructions further configure the at least one processor to collect the plurality of pieces of measured information from the plurality of respective radio terminals, and
wherein the instructions further configure the at least one processor to compare the plurality of pieces of measured information which was collected with the plurality of pieces of prediction information.

7. The information processing apparatus according to claim 1, wherein:
the measured information comprises a combination of a plurality of cells in which the reception information is measured for each of the radio terminals and the reception information in each cell,
the prediction information comprises a combination of a plurality of cells that are predicted to be able to communicate with the one radio terminal for each of the local areas and the reception information in each cell, and
the instructions further configure the at least one processor to determine whether the prediction information is within a predetermined range of the measured information based on a combination of the plurality of cells in the plurality of pieces of prediction information and that in the plurality of pieces of measured information that agree with each other and the degree of agreement of the reception information corresponding to the respective cells that agree with each other.

8. The information processing apparatus according to claim 7, wherein:
the instructions further configure the at least one processor to associate the radio terminal in measured information within a predetermined range of the prediction information, among the plurality of pieces of measured information, with the local area in the prediction information, and
the number of radio terminals that have been associated is aggregated for each of the plurality of local areas.

9. The information processing apparatus according to claim 7, wherein the reception information comprises at least one of RSRP (Reference Symbol Received Power), RSRQ (Reference Symbol Received Quality), and RSSI (Received Signal Strength Indicator).

10. The information processing apparatus according to claim 7,
wherein the instructions further configure the at least one processor to collect the plurality of pieces of measured information from the plurality of respective radio terminals, and
wherein the instructions further configure the at least one processor to compare the plurality of pieces of measured information which was collected with the plurality of pieces of prediction information.

11. The information processing apparatus according to claim 1, wherein:
the instructions further configure the at least one processor to associate the radio terminal in measured information within a predetermined range of the prediction information, among the plurality of pieces of measured information, with the local area in the prediction information, and
the number of radio terminals that have been associated is aggregated for each of the plurality of local areas.

12. The information processing apparatus according to claim 11, wherein the reception information comprises at least one of RSRP (Reference Symbol Received Power), RSRQ (Reference Symbol Received Quality), and RSSI (Received Signal Strength Indicator).

13. The information processing apparatus according to claim 11,
wherein the instructions further configure the at least one processor to collect the plurality of pieces of measured information from the plurality of respective radio terminals, and
wherein the instructions further configure the at least one processor to compare the plurality of pieces of measured information which was collected with the plurality of pieces of prediction information.

14. The information processing apparatus according to claim 1, wherein the reception information comprises at least one of RSRP (Reference Symbol Received Power), RSRQ (Reference Symbol Received Quality), and RSSI (Received Signal Strength Indicator).

15. The information processing apparatus according to claim 14,
wherein the instructions further configure the at least one processor to execute the instructions to collect the plurality of pieces of measured information from the plurality of respective radio terminals, and
wherein the instructions further configure the at least one processor to compare the plurality of pieces of measured information which was collected with the plurality of pieces of prediction information.

16. The information processing apparatus according to claim 1, wherein the instructions further configure the at least one processor to collect the plurality of pieces of measured information from the plurality of respective radio terminals, and
wherein the instructions further configure the at least one processor to compare the plurality of pieces of measured information which was collected with the plurality of pieces of prediction information.

17. The information processing apparatus according to claim 1,
wherein the instructions further configure the at least one processor to predict the reception information in the one radio terminal for each of the plurality of local areas as the plurality of pieces of prediction information, and
wherein the instructions further configure the at least one processor to compare the plurality of pieces of measured information with the plurality of pieces of prediction information which was predicted.

18. A radio communication system, comprising:
a plurality of radio terminals;
a plurality of base stations that can communicate with at least one of the plurality of radio terminals; and an information processing apparatus that can communicate with the plurality of base stations, wherein the information processing apparatus comprises:
  at least one memory with instructions stored thereon, and
  at least one processor in communication with the memory and configured, upon execution of the instructions, to:
    compare a plurality of pieces of measured information with a plurality of pieces of prediction information, the measured information being obtained by measuring a signal received from a base station, which is measured by each of a plurality of radio terminals for each of a plurality of cells of a plurality of base stations, the prediction information which is predicted as the reception information in one radio terminal for each of a plurality of local areas, and the local area is a part of a region in a service area of one base station; and
    aggregate the number of radio terminals which have measured the measured information which is within a predetermined range of the prediction information, among the plurality of pieces of measured information, for each of the plurality of local areas, thereby to identify a hotspot in at least one of said plurality of cells.

19. A terminal position estimation method that estimates positions of a plurality of radio terminals using an information processing apparatus, the terminal position estimation method comprising:
  comparing, by the information processing apparatus, a plurality of pieces of measured information with a plurality of pieces of prediction information, the measured information being obtained by measuring a signal received from a base station, which is measured by each of a plurality of radio terminals for each of a plurality of cells of a plurality of base stations, the prediction information which is predicted as the reception information in one radio terminal for each of a plurality of local areas, the local area is a part of a region in a service area of one base station, and
  aggregating, by the information processing apparatus, the number of radio terminals which have measured the measured information which is within a predetermined range of the prediction information, among the plurality of pieces of measured information, for each of the plurality of local areas, thereby to identify a hotspot in at least one of said plurality of cells.

20. A non-transitory computer readable medium having stored thereon a terminal position estimation program that, upon execution by a computer, causes the computer to execute the following processing of:
  comparing a plurality of pieces of measured information with a plurality of pieces of prediction information, the measured information being obtained by measuring a signal received from a base station, which is measured by each of a plurality of radio terminals for each of a plurality of cells of a plurality of base stations, the prediction information which is predicted as the reception information in one radio terminal for each of a plurality of local areas, and the local area is a part of a region in a service area of one base station; and
  aggregating the number of radio terminals which have measured the measured information which is within a predetermined range of the prediction information, among the plurality of pieces of measured information, for each of the plurality of local areas, thereby to identify a hotspot in at least one of said plurality of cells.

* * * * *